(12) United States Patent
Grumbach et al.

(10) Patent No.: US 7,445,573 B2
(45) Date of Patent: Nov. 4, 2008

(54) TRANSMISSION DEVICE OF A VEHICLE

(75) Inventors: Martin Grumbach, Heimenkirch (DE); Matthias Reisch, Ravensburg (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 317 days.

(21) Appl. No.: 11/371,815

(22) Filed: Mar. 8, 2006

(65) Prior Publication Data
US 2006/0205552 A1 Sep. 14, 2006

(30) Foreign Application Priority Data
Mar. 8, 2005 (DE) .................. 10 2005 010 448

(51) Int. Cl.
*F16H 3/72* (2006.01)
(52) U.S. Cl. ............... 475/5; 475/311; 180/65.2; 180/65.4; 180/65.7
(58) Field of Classification Search ............ 475/5, 475/311; 477/3; 180/65.2, 65.4, 65.7
See application file for complete search history.

(56) References Cited

U.S. PATENT DOCUMENTS

| | | | |
|---|---|---|---|
| 6,599,216 B1 | 7/2003 | Wafzig et al. | |
| 6,645,105 B2* | 11/2003 | Kima | 475/5 |
| 6,740,002 B1* | 5/2004 | Stridsberg | 477/14 |
| 6,752,232 B1 | 6/2004 | Hoher | |
| 7,056,252 B2 | 6/2006 | Gumpoltsberger et al. | |
| 7,056,260 B2* | 6/2006 | Nakamori et al. | 477/3 |
| 7,261,671 B2* | 8/2007 | Ortmann et al. | 477/6 |
| 7,322,900 B2* | 1/2008 | Ichioka et al. | 475/159 |
| 2004/0211604 A1* | 10/2004 | Heitmann et al. | 180/65.2 |

FOREIGN PATENT DOCUMENTS

JP        2002-172946        6/2002

* cited by examiner

*Primary Examiner*—David D. Le
(74) *Attorney, Agent, or Firm*—Davis Bujold & Daniels, P.L.L.C.

(57) ABSTRACT

A transmission device (3) of a vehicle for distributing a driving torque of a transmission input shaft (13) to at least two transverse vehicle shafts (4; 4X; 4Y; 4Z; 5). Between the transmission input shaft (13) and a transmission output shaft (15) gear elements (16 to 25) are disposed in a housing (11) for the purpose of implementing different gear ratios. One of the vehicle axles (4; 4X; 4Y; 4Z) extends through an inner space (10) of the housing (11). In a cross-sectional area disposed perpendicular to the longitudinal axis of the transmission device (3), in which area the transverse vehicle shaft (4; 4X; 4Y; 4Z) that is guided through the housing (11) is disposed, at least part of an electrical device (45, 46), which is mounted to the housing side, and/or at least part of a temperature control unit (47), which is mounted to the housing side, are provided.

19 Claims, 3 Drawing Sheets

TRANSMISSION DEVICE OF A VEHICLE

This application claims priority from German Application Serial No. 10 2005 010 448.7 filed Mar. 8, 2005.

FIELD OF THE INVENTION

The invention relates to a transmission device of a vehicle for distributing a driving torque of a transmission input shaft to at least two transverse vehicle shafts.

BACKGROUND OF THE INVENTION

DE 199 43 623 A1 discloses a gearbox unit for motor vehicles, by way of which a driving torque of a driving motor can be transmitted to at least one transverse vehicle shaft as a function of the operating state. The gearbox unit comprises a housing, a drive shaft and at least one driven shaft. Between the drive shaft and the driven shaft, a continuously variable transmission is provided by way of which a gear ratio between the drive shaft and the driven shaft can be continuously varied.

Additionally, a second transmission output shaft is provided, via which part of the driving torque of the driving motor can be transmitted to a second drivable transverse vehicle axis, wherein the second transverse vehicle axis is disposed such that it extends through an inside space of the housing of the transmission unit.

The disadvantage, however, is that no rotating components can be arranged in a cross-sectional area standing perpendicular in relation to the longitudinal axis of the transmission device in which area the transverse vehicle shaft that is guided through the housing of the transmission unit is arranged so that the cross-sectional area essentially is a space that cannot be used for the rotating gear components of the transmission unit. In the cross-sectional area of the transverse vehicle shaft extending through the inner space of the transmission unit, the transmission unit has unused volumes and/or dead space remaining free, which is not desirable. This dead space results in unnecessarily large outer dimensions of the transmission unit which, in turn, lead to a high space requirement for the transmission unit.

DE 199 50 047 A1 reveals a gearbox unit for a motor vehicle in which a transverse vehicle shaft is guided through the inner space of the gearbox housing, viewed in the transverse vehicle direction. With this gearbox unit, an oil supply system comprising a pump is disposed in the cross-sectional area arranged perpendicular to the longitudinal axis of the gearbox unit in which area the transverse vehicle shaft that is guided through the housing is arranged.

The disadvantage, however, is that the pump of the oil supply system is a rotating component and the dimensions of the pump in the radial direction in the cross-sectional area of the transmission device are limited by the arrangement of the transverse vehicle shaft. Additionally, the ability to position the transverse vehicle shaft in the cross-sectional area of the transmission device is only possible in a radial ring section due to the rotating pump of the oil supply system, which section is delimited by the housing of the transmission unit and the housing of the pump so that the transmission unit can be used only to a limited extent in various motor vehicles having different constructions.

It is, therefore, the object of the present invention to provide a transmission device comprising a transverse vehicle axis extending through the housing of the transmission device, which device has a compact design and can be installed easily in various vehicle types.

SUMMARY OF THE INVENTION

The transmission device of a vehicle according to the invention, which is used to distribute a driving torque of a transmission input shaft to at least two transverse vehicle shafts, is configured with gear elements between the transmission input shaft and a transmission output shaft, which elements are disposed in a housing of the transmission unit in order to implement different gear ratios. A drivable transverse vehicle shaft connectedly actively to the transmission output shaft extends through the inner space of the housing.

Due to the fact that at least one electrical device, which is mounted to the housing side, and/or at least one temperature control unit, which is mounted to the housing side, are disposed in a cross-sectional area arranged perpendicular to the longitudinal axis of the transmission device in which area the transverse vehicle shaft that is guided through the housing of the transmission device is arranged, an area of the inner space of the transmission device, which due to the arrangement of the transverse vehicle shaft is not usable for rotating gear components, is utilized in a simple manner so that the transmission device has an extremely compact design.

Additionally, due to the assemblies that are mounted to the housing side in the cross-sectional area, i.e., the non-rotating assemblies, the transmission device according to the invention can be used in various motor vehicles with varying designs since the assemblies that are mounted to the housing side in the cross-sectional area can be arranged arbitrarily. The arbitrary positioning of the electrical device, which is mounted to the housing side, and/or the temperature control unit, which is likewise mounted to the housing side, is based on the fact that the non-rotating assemblies, i.e., the temperature control unit and the electrical device, can be arranged in the cross-sectional area without mechanical linkage to a torque-transmitting component of the transmission device.

BRIEF DESCRIPTION OF THE DRAWINGS

The invention will now be described, by way of example, with reference to the accompanying drawings. With reference to the embodiments that are schematically illustrated in the Figures, for reasons of clarity, components having the same design and function have been given the same reference numerals in the description of the different embodiments.

DETAILED DESCRIPTION OF THE INVENTION

Figure 1:
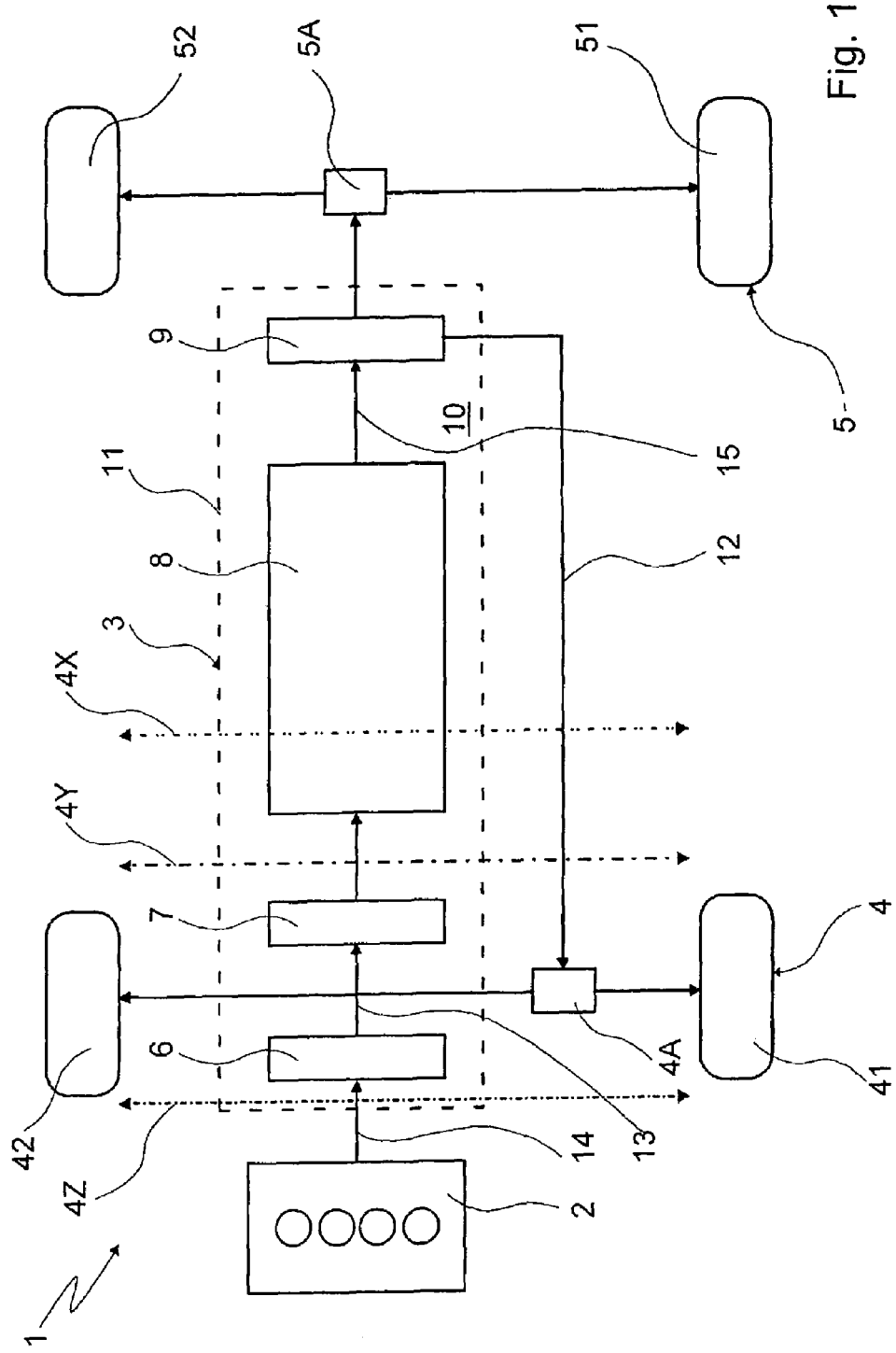
FIG. 1 Is a strongly schematized block diagram of a power train of a motor vehicle.

FIG. 1 shows a strongly schematized block diagram of a power train 1 of a motor vehicle, comprising a driving motor 2, a transmission device 3 as well as two drivable transverse vehicle shafts 4, 5. The transmission device 3 in the present case is provided with a vibration reducing element 6, a starting element 7, a manually operated transmission device 8 for implementing various gear ratios and, on the transmission output side, with a transfer element 9 for distributing a driving torque between the two transverse vehicle shafts 4 and 5. The transverse vehicle shaft 4, which can be configured as a vehicle front axle or as a vehicle rear axle, in the present case extends in the vehicle transverse direction through an inner space 10 of a housing 11 of the transmission 3, which housing is illustrated by a dash-dotted rectangle in FIG. 1, between the vibration reducing element 6 configured as a flywheel and the starting element 7. The transverse vehicle shaft 5 is disposed outside the housing 11 and actively connected to the transfer element 9.

In tractor operation of the power train 1, a driving torque of the driving motor 2 is transmitted via the transmission device 3 in the amount corresponding to the respective gear ratio defined in the transmission device 3 to the two transverse vehicle shafts 4 and 5. Part of the transmission output torque is directed from the transfer element 9 in the vehicle longitudinal direction to a differential 4A of the transverse vehicle shaft 4 and is distributed via the differential 4A in the transverse vehicle direction between two wheels 41, 42 of the transverse vehicle shaft 4 as a function of the operating mode. At the same time, the other part of the transmission output torque is directed from the transfer element 9 in the vehicle longitudinal direction to a differential 5A of the transverse vehicle shaft 5 and is distributed via the differential 5A in the transverse vehicle direction between two wheels 51 and 52 of the transverse vehicle shaft 5 as a function of the operating mode. The transfer element 9 and the differential 4A of the transverse vehicle shaft 4 are actively connected via a guiding shaft 12 extending in the vehicle longitudinal direction.

In pusher operation of the power train 1, torque in the power train 1 originating from the transverse vehicle shafts 4 and 5 is transmitted in the direction of the driving motor 2 via the transmission device 3 and supported there at least partially.

Of course, it is within the discretion of the specialist to run the transverse vehicle shaft 4, as a function of the respective application deviating from the arrangement shown in FIG. 1 between the vibrating damping element 6 and the starting element 7 in the vehicle longitudinal direction, in another area in the transverse vehicle direction through the housing 11 of the transmission device 3. To this end, three alternative configurations of the transverse vehicle shaft 4 are illustrated by way of example in FIG. 1, which have been marked with reference numerals 4X, 4Y and 4Z.

Figure 2:
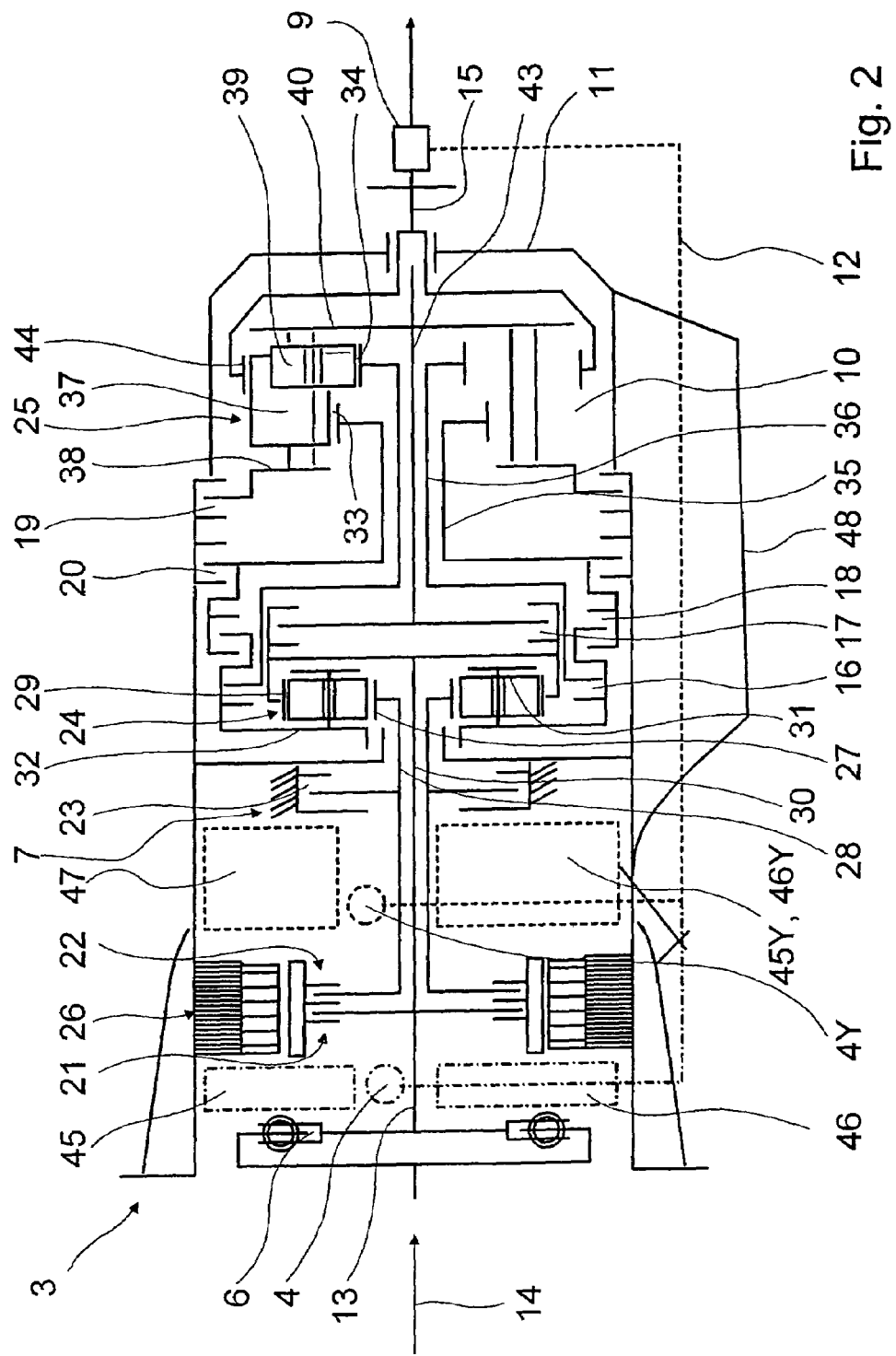
FIG. 2 Is a gear diagram of a first embodiment of a transmission device configured according to the invention.

FIG. 2 illustrates a gear diagram of a first embodiment of the transmission device 3 schematically represented in FIG. 1, which is an automatic transmission device for vehicles, particularly motor vehicles.

The multi-speed transmission device 3 comprises, among other things, a transmission input shaft 13, which is mechanically linked on the input side to the vibration reducing element 6 configured as a torsional vibration damper element and in the installed position of the transmission device 3 is positioned above the transverse vehicle shaft 4 in relation to the vehicle bottom. On the side of the vibration reducing element 6 facing away from the transmission input shaft 13, an engine output shaft 14 is provided so that the transmission input shaft 13 is mechanically linked to the engine output shaft 14 via the vibration reducing element 6. On the output side, the transmission device 3 is provided with a transmission output shaft 15, which in the mounted state of the transmission device 3 is mechanically linked to the transverse vehicle shafts 4 and 5 shown in FIG. 1 by means of the transfer element 9.

For the purpose of producing different gear ratios, several control elements 16 to 23, a first planetary gearset 24, a second planetary gearset 25 and moreover an electrical machine 26 are provided between the transmission input shaft 13 and the transmission output shaft 15. The first planetary gearset 24, which in the present case is configured as a simple planetary gearset, is arranged upstream from the second planetary gearset 25, which is configured as a Ravigneaux planetary gearset.

With the transmission concept in FIG. 2, for example, a multi-speed automatic transmission of a motor vehicle can be implemented, having six forward gears and one reverse gear wherein, as a function of selecting the control elements 16 to 23 as well as the electrical machine 26, an overall gear ratio of the transmission device 3 required by a transmission control unit or an overall gear ratio of the transmission device 3 required by the driver is set, depending on the respective operating mode.

A sun gear 27 of the first planetary gearset 24 is connected via a sun gear shaft 28 to the control element 23, which is configured as a starting brake and illustrates the starting element 7, so that a vehicle that is equipped with the transmission device 3 can be started without a hydrodynamic torque converter. The electrical machine 26 is configured in the present case as a starter and generator device, which is associated with an electrical device 45 that is mounted to the housing side and comprises the power electronics and control electronics of the electrical machine 26 in a cross-sectional area disposed perpendicular to the longitudinal axis of the transmission device 3 in which area the transverse vehicle axis 4 that is guided through the housing 11 is arranged. The electrical machine 26 is connected via the power electronics of the electrical device 45 to another component 46 of the electrical device 45, which is likewise disposed in the cross-sectional area of the transmission device 3 and is configured as an energy accumulator.

The integration of the electrical machine 26 in the transmission device 3 offers the possibility of starting a vehicle equipped with the transmission device 3 from a "neutral gear" operating state. Moreover, the arrangement of the electrical device 45 with the power electronics and control electronics and the energy accumulator 46 in the cross-sectional area of the transmission device 3 in which the transverse vehicle axis 4 is guided through the housing 11, makes it possible to design the electrical machine 26 and the corresponding electrical device 45 with the energy accumulator 46 as a module, the function of which can be easily tested prior to installation and which during the assembly of the transmission device 3 can be easily inserted in the housing 11 of the transmission device 3 in one operation. This advantageously results in simplified assembly and moreover reduces inventory costs because only a single compact module has to be provided.

Furthermore, due to the arrangement of the electrical device 45 with the energy accumulator 46 in the cross-sectional area of the transmission device 3, in which area the transverse vehicle shaft 4 is disposed, the transmission device 3 is characterized by a compact design because room in the inner space 10 of the transmission device 1 that cannot be used for rotating gear components is occupied by non-rotating assemblies, i.e., assemblies attached to the housing.

Between the electrical machine 26 and the first planetary gearset 24, the first control element 21 configured as a frictionally engaged clutch and the second control element 22, which is likewise configured as a friction-locking clutch, are provided in the axial direction of the transmission input shaft 2, via which control elements the electrical machine 26 in the closed state can be mechanically linked to an annulus gear 29 or the sun gear shaft 28 of the first planetary gearset 24, respectively.

For starting, for example, the driving motor 2, which is mechanically linked to the transmission input shaft 13 and is configured as an internal combustion engine, the second control element 22 is closed, and a starter torque produced by the electrical machine 26 is introduced into the first planetary gearset 24 via the sun gear shaft 28. This doubles the starter torque of the electrical machine 26, which is transmitted to the transmission input shaft 13 and from there to the crankshaft of the driving motor.

Due to a speed-variable engagement of the electrical machine 26 with the sun gear shaft 28, during driving mode not only seven forward gears with fixed gear ratios, but also five forward travel ranges with continuously variable gear ratios can be selected. Additionally advantageously the possibility exists during driving mode, particularly during a braking mode by means of the electrical machine 26, of performing an energy recuperation and storing the electrical energy produced by the electrical machine 26, operated in this case as a generator, in the energy accumulator 46, which is connected to the electrical machine 26.

Additionally, a vehicle that is equipped with the transmission device 1 according to the invention allows an emission-free electrical driving mode in the forward travel direction and the backward travel direction, for example when maneuvering in inner cities.

The arrangement of the first control element 21 and the second control element 22 makes it possible to connect the electrical machine 26 to the transmission input shaft 13 via the first control element 21 after starting the driving motor 2. The transmission input shaft 13 is then connected directly to the engine output shaft 14 of the driving motor 2.

This operating mode of the transmission device 3 advantageously offers the possibility of being able to provide a driver upon request with increased torque from the internal combustion engine, enabling a boost operation. Additionally, such a connection of the components in the transmission device 3 provides permanent electrical power to the electrical onboard network in the generator mode of the electrical machine 26. If both the first control element 21 and the second control element 22 are closed at the same time, the first planetary gearset 24 is blocked, so that two additional forward gears and one additional reverse gear can be engaged by combining the first planetary gearset 24 and the second planetary gearset 25.

The annulus gear 29 of the first planetary gearset 24 is permanently connected to the transmission input shaft 13 by way of an internal gear shaft 30. A planetary gears 31 of the first planetary gearset 24 are connected to a planet carrier 32, which can, in turn, be connected to the second planetary gearset 25 by way of the control elements 16, 17 and 18 or can be blocked with the housing 11 of the transmission device 3 by way of the control element 20 configured as a brake.

The second planetary gearset 25 comprises substantially a first sun gear 33 and a second sun gear 34, which can be connected to the first planetary gearset 24 by way of a first sun gear shaft 35 as well as a second sun gear shaft 36 or can be blocked with the housing 11 by way of the brake 20. A set of first planetary gears 37 is mounted to a first planet carrier 38 of the second planetary gearset 25, which can be blocked with the housing 11 by way of the brake 19. Both the first planetary gears 37 and second planetary gears 39 can be connected to the first planetary gearset 24 by way of a second planet carrier 40 and an intermediate shaft 43. An annulus gear 44 of the second planetary gear set 25 is connected directly to the transmission output shaft 15 of the transmission device 3.

The arrangement of the electrical machine 26 and the electrical device 45 interacting therewith, which is illustrated in FIG. 2, offers the advantage that, compared to power electronics disposed outside the transmission device 3, considerably shorter power supply lines between these two components can be provided as the active connection. Due to the low resistance of the power supply lines, it is also possible to achieve low heat development and few electromagnetic compatibility problems, while achieving simultaneously good efficiency. Additionally, the manufacturing costs as well as the weight are lower, since in the area of the active connection between the electrical machine 26 and the electrical device 45, little material is required. Due to the adjoining arrangement of the power electronics to the electrical machine 26, for example, it is possible to connect the ends of the coil of the electrical machine by way of inexpensive plug contacts, rivet connections, screw connections, weld connections, soldered connections, glued connections, bonded connections or pressure-based connections, such as a clamping connection for example, which are all characterized by low transition resistance.

Since the coil of the electrical machine 26 is connected directly to the power electronics of the electrical device 45 disposed adjacent to the electrical machine 26 without interposing additional electrical lines, it is easily possible to connect the coil ends optionally directly to the support plate of the power electronics by way of one of the afore-mentioned connections or connect them electrically directly to one of the semi-conductors provided on the carrier plate by means of a bonded connection. The latter electrically conductive active connection between the coil ends and the semi-conductors of the power electronics offers the advantage that no additional lines are required between the semi-conductor elements and the coil ends, unlike the connection of the coil ends to the carrier plate. This again advantageously lowers the resistance between the semi-conductor elements and the coil ends because one less contact exists.

The connections between the coil ends and the power electronics are designed to be elastic, such that the operating temperature fluctuations and vibration loads in the connecting area can be compensated.

Furthermore, the electrical machine 26 and the power electronics are firmly connected to each other in the area of rigid carrier elements, wherein this connection is preferably likewise designed to be elastic to compensate operating temperature fluctuations and vibration loads.

Beyond that, every coil section of the electrical machine 26 can be automatically coupled to the carrier plate of the power electronics via a direct link, which advantageously eliminates the complex summation of the coil currents in the case of coils connected parallel. Additionally, the coil sections of the coil of the electrical machine 26 can be optionally controlled individually or in groups. Grouping the coil sections offers the further possibility of connecting only one coil section of a coil group to an ammeter for the purpose of determining the currents of the coil sections in one coil group since the coil currents of the coil sections of a coil group are identical.

Moreover, a housing for the electrical device 45 may have a simpler design than conventional transmission devices, and the housing 11 of the transmission device 3 additionally shields the electromagnetic waves originating from the electrical machine 26 as well as the electrical device 45 towards other assemblies of a vehicle.

Since the electrical device 45 also includes the control electronics unit in addition to the power electronics unit, the electrical device 45 is connected only via two contacts as well as a data connector to a higher-ranking control unit of the vehicle, where a comprehensive power train management takes place.

Furthermore, FIG. 2 illustrates an alternative arrangement to the previously described arrangement of the transverse vehicle shaft 4 of the transverse vehicle shaft 4 through the transmission housing 11 of the transmission device 3, which is marked in detail with the reference numeral 4Y and illustrated as a dash-dotted line.

The transverse vehicle shaft 4Y is disposed between the electrical machine 26 and the manually operated transmission device 8, wherein in the cross-sectional region, which is arranged perpendicular to the longitudinal axis of the transmission device 3 and in which the transverse vehicle shaft 4Y is positioned, in addition to the electrical device 45 at least part of a temperature control device 47 is arranged, which is mounted to the housing side, so that the cross-sectional area that cannot be used for rotating gear components is used by the electrical device and an additional component. The temperature control device 47 in the present case comprises a distributing element disposed in the cross-sectional area, which may be configured as a valve, slide, baffle or the like, for the purpose of distributing fluid circulating in the temperature control device, by means of which fluid thermal energy can be conducted into the housing 11 of the transmission device 3 or out of the housing 11 of the transmission device 3.

Additionally, it may be provided that the distributing element can be controlled and/or regulated in order to be able to distribute the fluid circulating in the temperature control device 47 as needed.

Moreover it may also be provided that in the cross-sectional area of the transmission device 3, in which the transverse vehicle shaft 4Y is disposed, fluid currents circulating inside the housing 11 are united and are guided from there out of the transmission device 3 via a single line.

The cross-sectional area of the transmission device 3, in which the transverse vehicle shaft 4Y is disposed, also comprises an electrical device 45Y interacting with the electrical machine 26 with the power electronics and control electronics as well as the energy accumulator 46Y of the electrical device 45Y, which is actively connected to the electrical machine via the power electronics and control electronics; these parts are temperature-controlled by way of the same temperature control circuit as the electrical machine 26.

Of course, it is within the discretion of the specialist to control the temperature of the electrical machine 26, the electrical device 45Y and the energy accumulator 46Y as well as additional assemblies of the transmission device 3 by means of separate temperature control circuits or temperature control circuits that are mutually coupled. The power electronics of the electrical machine 26, the control elements 16 to 23 and additional rotating gear components of the transmission device 3 may then be temperature-controlled by means of a common temperature control circuit, wherein the temperature of the electrical machine 26 can also be controlled by this temperature control circuit or a separate temperature control circuit. Furthermore, of course also the electrical machine 26 and the rotating gear components can be temperature-controlled by means of a common temperature control circuit.

In addition to the electrical device and the temperature control unit, there is also the possibility of positioning an electrical transmission control unit, which in conventional transmission devices is typically disposed in a pan 48 provided on the bottom of the housing 11 of the transmission device 3 in the installed state of the transmission device, in the open space of the cross-sectional area, in which the transverse vehicle axis 4 or 4Y is guided through the housing 11 in the transverse vehicle direction, so that the pan 48—compared to familiar transmission devices—can be configured to have smaller dimensions in the longitudinal direction of the transmission device 3 or in the circumferential direction of the transmission device 3, so that a transmission device 3 configured this way requires less installation space.

The previously mentioned temperature control devices are preferably operated with water as the cooling and/or heating medium, while hydraulic fluid is used in the conventional manner for cooling and lubricating the rotating gear components. This means that the temperature control device and the cooling and lubricating circuit for controlling the temperature of the control elements 16 to 23 are separate. For the heat exchange between the two circuits, a heat exchanger, which is not shown in detail in the Figure, is provided in the cross-sectional area of the transverse vehicle axis of the transmission device as well as of the planetary gear sets 24 and 25, by way of which heat exchanger thermal energy can be exchanged between the water circulating in the temperature control device and the hydraulic fluid.

Particularly when beginning to put a motor vehicle into operation, it is possible this way to raise the temperature of the hydraulic fluid recirculated in the cooling and lubricating circuit in the area of the heat exchanger as quickly as possible to the desired operating temperature by feeding thermal energy, and subsequently to cool it by suitable control and regulation using the water circulating in the temperature control device and thus adjust it to and/or maintain it at the operating temperature required for a flawless function of the transmission device 3.

Additionally, it is also feasible in the cross-sectional area of the transmission device 3, in which the transverse vehicle shaft 4, 4X, 4Y or 4Z is disposed, to position at least one sensor device for detecting the rotational speed, for detecting the temperature and/or for detecting electrical variables inside the housing 11 of the transmission device 3, which also results in a desired compact design of the transmission device 3.

In another embodiment of the transmission device according to the invention, it is provided that the temperature control device or parts thereof are disposed in the cross-sectional area, while the electrical device is provided in a different location in the housing or outside the housing of the transmission device.

Figure 3:
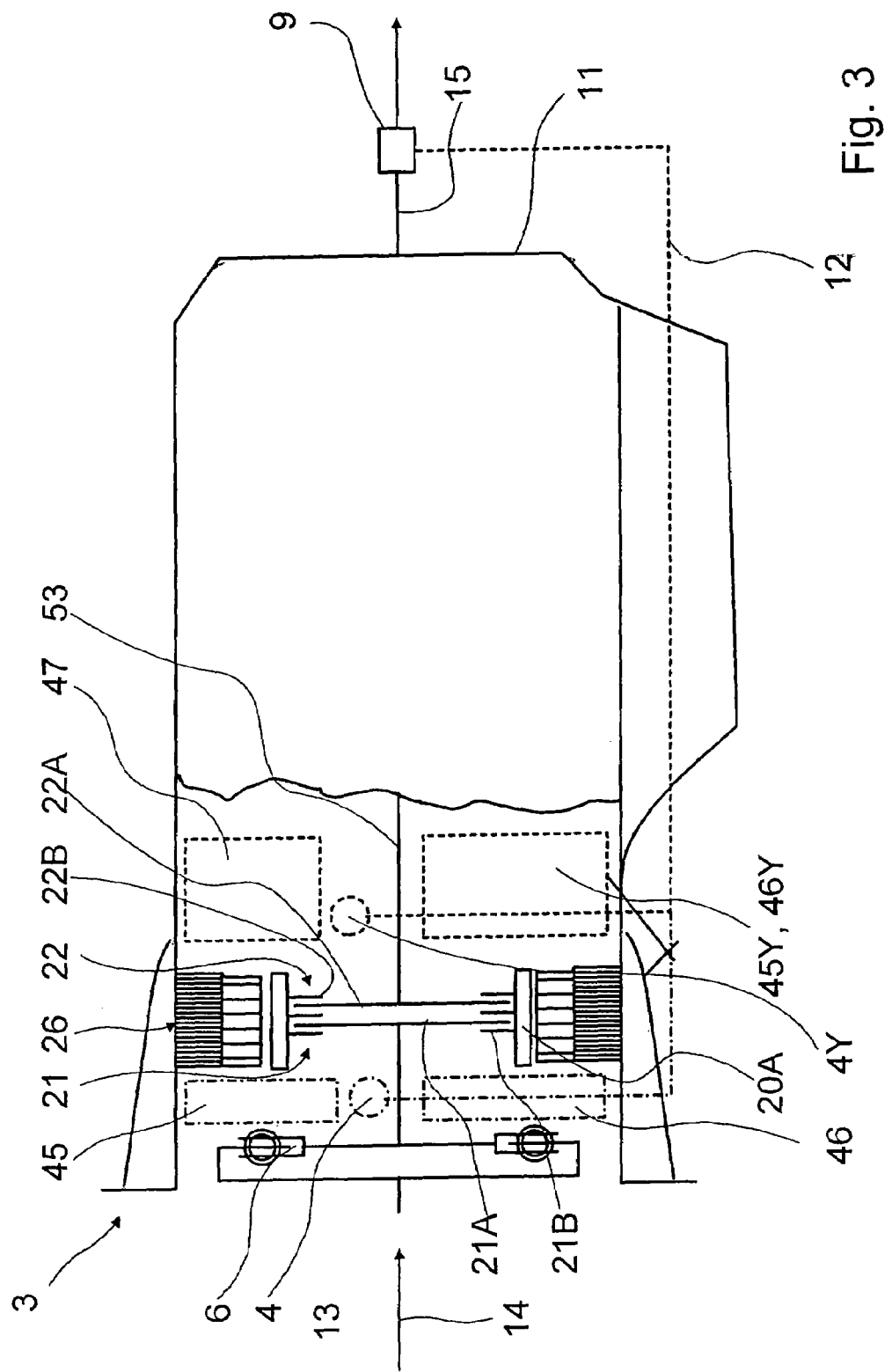
FIG. 3 Is a schematic partial section view of a second embodiment of a transmission device according to the invention.

FIG. 3 shows a partial sectional view of a second embodiment of a transmission device 3 configured according to the invention, which device differs from the embodiments shown in FIG. 2 both in the inlet area of the transmission device 1 and in the shifting area, by way of which the gear ratio of the transmission device 3 is varied.

In the transmission device 3 illustrated in FIG. 3, the transmission input shaft 13 is connected to an inside disk carrier 21A of the first control element 21. Furthermore, an outside disk carrier 21B is connected to and forms one piece with an outside disk carrier 22B of the second control element 22 and a rotor 26A of the electrical machine 26. An inside disk carrier 22A of the second control element 22 is connected non-rotatably to a central gear shaft 53 extending in the direction of the shifting area.

Consequently, the driving motor 2 is only connected to the transverse vehicle shafts 4, 4X, 4Y or 4Z, 5 when the transmitting ability of the control elements 21 and 22 is such that the driving torque of the driving motor 2 applied via the transmission input shaft 13 can be directed via the inside disk carrier 21A, the outside disk carrier 21B or 22B and the inside disk carrier 22B of the second control element 22 to the central gear shaft 53. This means that the two control elements 21 and 22 have assumed at least a torque-transmitting slip operation or a loss-free, i.e., slip-free state.

If the first control element 21 is completely closed and the second control element 22 completely open, a mechanical link only exists between the electrical machine 26 and the driving motor 2 so that either the driving motor 2 can be driven by the electrical machine 26, for example for starting the driving motor 2, or an energy accumulator of the electrical machine 26 can be charged by the driving motor 2 when the electrical machine 26 is in the generator mode.

If both control elements 21 and 22 are controlled such that the first control element 21 is able to transmit, that no torque can be transmitted via the first control element and torque that is applied via the second control element 22 can be guided in the direction of the electrical machine 26 or in the direction of the transmission output of the transmission device 3, it is advantageously possible to drive a vehicle equipped with the transmission device 3 in electrical mode or to apply a braking torque at the output of a vehicle when the electrical machine 26 is operated as a generator.

As an alternative to the transmission device 3 shown in FIG. 2, the transmission device 3 from FIG. 3 is provided with a gear element, which is not represented in greater detail and by means of which a gear ratio of the transmission device 3 is continuously variable. For this purpose a known variator with thrust jointed band, which is not represented in greater detail, is provided. Of course, it is at the discretion of the person skilled in the art to provide a different gear element as a function of the respective application, by means of which the gear ratio of the transmission device 3 is continuously variable.

Beyond that, it is provided in another advantageous embodiment of the transmission device of the invention, which is not represented in detail, that the transmission device is configured with gear elements for changing the gear ratios of the transmission device as well as with at least one gear element for continuously varying the speed. The gear ratio of such a transmission device is continuously variable in at least one gear ratio range.

As an alternative to the examples of the inventive transmission device described above, or as a combination thereof, it may also be provided that at least part of an electrical device configured as an electrical transmission control unit or as an electro-hydraulic transmission control unit is disposed in the cross-sectional area of the transmission device, in which the drivable transverse gear shaft is guided through the housing of the transmission device. In the case of an electro-hydraulic transmission control unit this may be pressure governors such as solenoid valves as well as the corresponding electronic system, or valves arranged downstream from a pressure governor, such as proportional magnet control valves and the like.

REFERENCE NUMERALS 1 power train
2 driving motor
3 transmission device
4 transverse vehicle shaft
4A differential
4X, 4Y, 4Z transverse Vehicle Shaft
5 transverse Vehicle Shaft
5A differential
6 vibration reducing element
7 starting element
8 manually operated transmission device
9 transfer element
10 inner space of the transmission device
11 housing of the transmission device
12 guiding shaft
13 transmission input shaft
14 engine output shaft
15 transmission output shaft
16 control element
17 control element
18 control element
19 control element
20 control element, brake
21 control element, clutch
21A inside Disk Carrier
21B outside Disk Carrier
22 control Element, Multi-Disk Clutch
22A inside Disk Carrier
22B outside Disk Carrier
23 control element, starting brake
24 first planetary gearset
25 second planetary gearset
26 electrical machine
26A rotor
27 sun gear of the first planetary gearset
28 sun gear shaft
29 annulus gear of the first planetary gearset
30 internal gear shaft
31 planet gears of the first planetary gearset
32 planet carrier of the first planetary gearset
33 first sun gear of the second planetary gearset
34 second sun gear of the second planetary gearset
35 first sun gear shaft of the second planetary gearset
36 second sun gear shaft of the second planetary gearset
37 first planet gears of the second planetary gearset
38 first planet carrier of the second planetary gearset
39 second planet gears of the second planetary gearset
40 second planet carrier of the second planetary gearset
41, 42 wheel
43 intermediate shaft
44 annulus gear of the second planetary gearset
45 electrical device
45Y electrical device
46 energy accumulator
46Y energy accumulator
47 temperature control unit
48 pan
51, 52 wheel
53 central gear shaft

The invention claimed is:

1. A transmission assembly (3) of a vehicle comprising:
a transmission input shaft (13);
a transmission output shaft (15);
at least first and second transverse vehicle shafts (4; 4X; 4Y; 4X; 5) being coupled to the transmission input shaft (13) such that torque from the transmission input shaft (13) is transferred to at least one of the first and the second transverse vehicle shafts (4; 4X; 4Y; 4X; 5) for driving the vehicle;
a transmission housing (11) having a plurality of gear elements (16 to 25), for producing different gear ratios, being located between the transmission input shaft (13) and the transmission output shaft (15);
the first transverse vehicle shaft extending through an interior space (10) of the transmission housing (11) perpendicular to a longitudinal axis of the transmission assembly (3); and
at least one of an electrical device (45, 46; 45Y, 46Y) and a temperature control unit (47) being located within the transmission housing (11), on an axial side of the transmission housing (11) through which the first transverse vehicle shaft (4; 4X; 4Y; 4Z) extends.

2. The transmission assembly (3) according to claim 1, wherein the electrical device (45, 46; 45Y, 46Y) is an electrical transmission control unit.

3. The transmission assembly (3) according to claim 1, wherein the electrical device (45, 46; 45Y, 46Y) is an electro-hydraulic transmission control unit.

4. The transmission assembly (3) according to claim 1, wherein the temperature control unit (47) controls a temperature of hydraulic fluid located in the housing (11).

5. The transmission assembly (3) according to claim 1, wherein at least one sensor device is located in a cross-sectional area.

6. The transmission assembly (3) according to claim 1, wherein the gear elements are transmission steps (24, 25) which are connectable and disconnectable from a power flow through the gear elements (16 to 23) to implement speeds of the different gear ratios.

7. The transmission assembly (3) according to claim 1, wherein at least one gear element is provided by which a gear ratio, within at least one gear ratio range, is continuously varied.

8. The transmission assembly (3) according to claim 1, wherein an electrical machine (26) is located within the housing (11) and is actively connected to the transmission input shaft (13) and the electrical device (45; 45Y), and the electrical device (45; 45Y) comprises at least one power electronics system and one control electronics system to power and control the electrical machine (26).

9. The transmission assembly (3) according to claim 8, wherein the electrical device (45; 45Y) comprises an energy accumulator (46; 46Y) which interacts with the electrical machine (26).

10. The transmission assembly (3) according to claim 8, wherein at least one of the power electronics and the control electronics of the electrical device (45; 45Y) are disposed in the housing (11) adjacent to the electrical machine (26), the at least one of the power electronics and the control electronics and the electrical machine (26) are one of directly coupled, a module and mounted together.

11. The transmission assembly (3) according to claim 8, wherein the electrical machine (26) and the power electronics are firmly connected in an area of rigid carrier elements, and the connection between the electrical machine (26) and the power electronics is elastic to compensate for fluctuations in operating temperature and vibration loads.

12. The transmission assembly (3) according to claim 8, wherein the temperature control unit (47) allows for control of at least one of a temperature of the power electronics and the control electronics of the electrical device (45; 45Y).

13. The transmission assembly (3) according to claim 1, wherein the temperature control unit (47) allows for control of a temperature of the electrical machine (26).

14. The transmission assembly (3) according to claim 8, wherein the electrical machine (26) comprises a coil having several coil sections which has free ends directly connected to the power electronics system.

15. The transmission assembly (3) according to claim 14, wherein a connection between the free ends of the several coil sections and the power electronics is elastic to compensate for fluctuations in operating temperature and vibration loads of an area of the connection.

16. The transmission assembly (3) according to claim 1, wherein the temperature control unit (47) comprises at least one distributing element for distributing and uniting currents of a transmitting medium circulating in the temperature control unit (47).

17. The transmission assembly (3) according to claim 16, wherein the distributing element is one of controlled and regulated.

18. A transmission assembly (3) of a vehicle comprising:
a transmission input shaft (13);
a transmission output shaft (15);
at least first and second transverse vehicle shafts (4; 4X; 4Y; 4X; 5) being coupled to the transmission input shaft (13) such that torque from the transmission input shaft (13) is transferred to at least one of the first and the second transverse vehicle shafts (4; 4X; 4Y; 4X; 5) for driving the vehicle;
a transmission housing (11) having a plurality of gear elements (16 to 25), for producing different gear ratios, being located between the transmission input shaft (13) and the transmission output shaft (15);
the first transverse vehicle shaft (4; 4X; 4Y; 4Z) extending through an interior space (10) of the transmission housing (11) perpendicular to a longitudinal axis of the transmission assembly (3) and between the transmission input shaft (13) and the plurality of gear elements (16 to 25) for producing different gear ratios; and
at least one of an electrical device (45, 46; 45Y, 46Y) and a temperature control unit (47) being located within the transmission housing (11) vertically adjacent the first transverse vehicle shaft (4; 4X; 4Y; 4Z) which extends perpendicular to the longitudinal axis of the transmission assembly (3).

19. A transmission assembly (3) of a vehicle comprising:
a transmission input shaft (13);
a transmission output shaft (15);
at least first and second transverse vehicle shafts (4; 4X; 4Y; 4X; 5) being coupled to the transmission input shaft (13) such that torque from the transmission input shaft (13) is transferred to at least one of the first and the second transverse vehicle shafts (4; 4X: 4Y; 4X; 5) for driving the vehicle;
a transmission housing (11) having a plurality of gear elements (16 to 25), for producing different gear ratios, being located between the transmission input shaft (13) and the transmission output shaft (15);
the first transverse vehicle shaft (4; 4X; 4Y; 4Z) extending through an interior space (10) of the transmission housing (11) perpendicular to a longitudinal axis of the transmission assembly (3) and between the transmission input shaft (13) and the plurality of gear elements (16 to 25), for producing different gear ratios, and axially adjacent an electric motor accommodated within the transmission housing (11) and actively connected to the transmission input shaft (13); and
at least one of an electrical device (45, 46; 45Y, 46Y) and a temperature control unit (47) being located within the transmission housing (11) vertically adjacent the first transverse vehicle shaft (4; 4X; 4Y; 4Z), which extends perpendicular to the longitudinal axis of the transmission assembly (3).

\* \* \* \* \*